United States Patent [19]

Cormier

[11] 4,382,325

[45] May 10, 1983

[54] HEAVY PIPE JOINING SYSTEM

[76] Inventor: Lynn J. Cormier, 5316 Alpaca Dr., Marrero, La. 70072

[21] Appl. No.: 187,360

[22] Filed: Sep. 15, 1980

[51] Int. Cl.³ .......................... B23P 19/04; B66D 3/00

[52] U.S. Cl. ...................................... 29/238; 254/329; 254/334; 254/338

[58] Field of Search ................. 29/237, 238, 244, 468; 254/29 R, 329, 332, 335, 337, 380, 338, 325, 327, 334; 269/43; 405/154, 169, 170, 184

[56] References Cited

U.S. PATENT DOCUMENTS

| | | | |
|---|---|---|---|
| 1,435,059 | 11/1922 | Franzen | 254/263 |
| 3,061,916 | 11/1962 | Kretz | 29/238 |
| 3,168,287 | 2/1965 | Parola | 254/335 |
| 3,233,315 | 2/1966 | Levake | 29/237 |
| 3,322,398 | 5/1967 | Smith | 254/335 |
| 3,467,359 | 9/1969 | Durand | 254/380 |
| 3,639,967 | 2/1972 | Brighton | 29/237 |
| 3,808,866 | 5/1974 | Brabant | 72/705 |
| 3,829,064 | 8/1974 | Jackson | 254/332 |
| 3,834,169 | 9/1974 | Abbott | 29/237 |
| 3,927,457 | 12/1975 | Bickle | 29/237 |
| 4,215,849 | 8/1980 | Charland | 72/705 |
| 4,257,578 | 3/1981 | Allen | 254/335 |
| 4,296,917 | 10/1981 | Day et al. | 254/327 |

*Primary Examiner*—Lowell A. Larson
*Attorney, Agent, or Firm*—C. Emmett Pugh & Associates

[57] ABSTRACT

A light weight, portable, self-contained pipe joining device and system for installing succeeding, very heavy, concrete pipe sections into the end of a preceding pipe section positioned in a trench. The pipe joining device includes a power operated winch which is mounted on an adjustable height stand which may be mounted on a sled. The adjustable height stand allows the positioning of the winch inside the initial pipe section at the intersection of the horizontal and vertical centerline of the pipe section. The winch cable is anchored to the winch stand, passed through a snatch-block and secured to the winch drum. Secured to the snatch-block is a two part sling with a hook at the free end of each part. The winching cable assembly is led through the interior of the succeeding pipe section being installed, and the hooks are placed over the pipe wall at the far end. The pipe joining device is anchored in the initial pipe section by means of a static two part sling. The anchoring sling is attached to the stand of the pipe joining device, and hooks are fitted to the free ends. The anchoring hooks are placed over the pipe wall at the end of the initial pipe section to which the pipe section being installed is not to be joined. The winching action applies an axial pulling force to the succeeding pipe section, thereby properly seating it into the receiving end of the preceding, initial pipe section. The technique is then repeated for subsequent pipe sections to the capacity of the cable length of the pulling winch.

14 Claims, 5 Drawing Figures

HEAVY PIPE JOINING SYSTEM

BACKGROUND OF THE INVENTION

1. Field of Invention

This invention relates to improvements in the joining of succeeding, relatively heavy, pipe sections within a trench and particularly to a light weight, portable, self-contained pipe joining device which is compact, economical and simple to operate and to the corresponding system or method of joining such pipe sections.

2. Prior Art

The art of joining succeeding pipe sections within a trench requires the positioning of two pipe sections approximately end-to-end and the exerting of an axial force to mate the male and female ends of the pipe sections. The evolution is complicated by the frequently limited width of the trench, the occasionally substantial depth of the trench, the instability of the trench walls, the presence of water within the trench and the massive size of the pipe sections to be joined.

For this purpose, contractors have utilized heavy machinery to position the succeeding pipe section and an array of internally and externally positioned tugging devices which were electrical, mechanical and gasoline driven powered and hydraulically actuated to axially move the succeeding pipe sections to effect abutment with the preceding pipe section.

Approaches that have been considered include an externally placed, motor driven, hydraulically actuated cylinder to which is attached a cable gripping device (note for example U.S. Pat. No. 3,639,967 to J. E. Brighton, issued Feb. 8, 1972) or an internally placed, battery powered, hydraulically actuated cylinder to which is attached a cable gripping device (note for example U.S. Pat. No. 3,486,214 to J. J. Curtis and R. M. Sandvick, issued Dec. 30, 1969) or an externally placed, manually powered, hydraulically actuated cylinder to which is attached a jacking rod (note for example U.S. Pat. No. 3,469,298 to R. R. Pizzagalli issued Sept. 30, 1969).

While all these approaches attempted to overcome the dilemmas of joining succeeding pipe sections, they failed to adequately solve the problem. In some instances, heavy external members were required to support the externally positioned pipe joining device, while in other instances the pipe joining device must be repositioned with each succeeding pipe section to be joined. In still other instances, a significant separate power source was required.

The present invention provides an alternate solution to the difficulties of the prior art. This alternate solution is new, not obvious to one skilled in the art and of great utility.

3. Summary Discussion of the Invention

It is therefore an object of the present invention to provide a light weight, portable, self-contained pipe joining device and system which may be operated by a single individual.

It is another object of this invention to provide a pipe joining device and system which is positioned internally in the preceding, initial pipe section and may remain stationary while joining a multiple number of succeeding pipe sections.

It is still another object of this invention to provide a pipe joining device and system which may join succeeding pipe sections without the assistance of heavy equipment to axially move the succeeding pipe section.

It is still another object of this invention to provide a pipe joining device and system which may be readily aligned with the intersection of the horizontal and vertical centerline of the preceding pipe section to facilitate positioning and mating of the succeeding pipe sections.

It is still another object of this invention to provide a pipe joining device and system which may be successfully used in confined areas with limited access.

BRIEF DESCRIPTION OF THE DRAWINGS

Other objects and advantages of the present invention and a full understanding thereof may be had by referring to the following detailed description and claims, taken together with the accompanying drawings, briefly described below in which like parts are given like reference numerals.

DETAILED DESCRIPTION OF THE PREFERRED EMBODIMENTS

Figure 1:
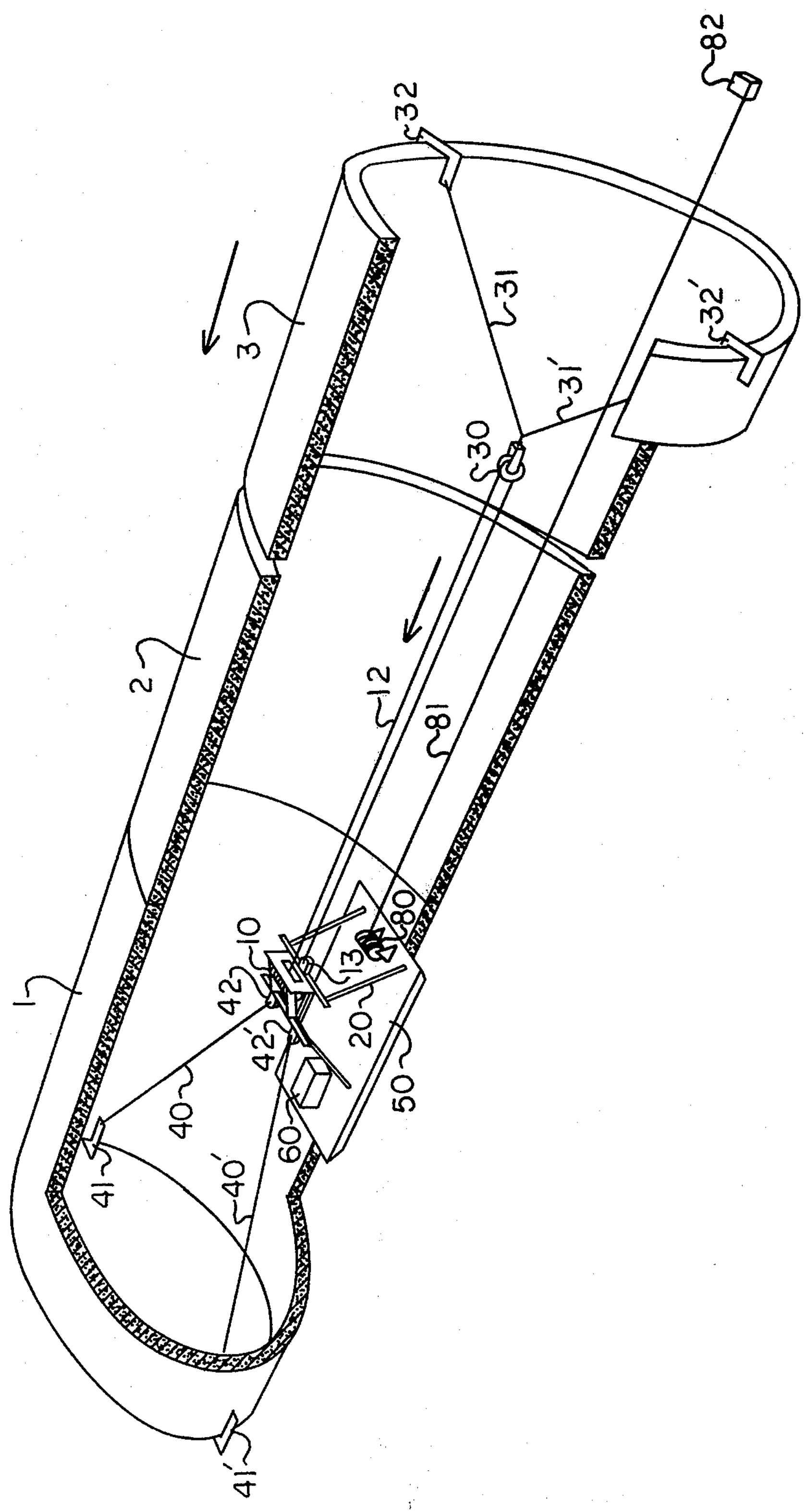
FIG. 1 is a perspective view of the preferred embodiment of the pipe joining device and system of the present invention depicting its characteristics and showing same in a typical, simplified, environmental setting with portions of the pipe walls cut away.

The preferred embodiment of the light weight, portable, self-contained pipe joining device and system of the present invention in a typical, simplified, environmental setting is shown in FIG. 1.

FIG. 1 depicts a representative but simplified or generalized environmental setting in which a preceding, initial pipe section 1 has been positioned in place in the pipeline trench (not illustrated for simplicity purposes). The preferred embodiment of the pipe joining device of the present invention is fully rigged and located in the initial pipe section, and a succeeding pipe section 3 has been positioned for being pulled in and mated with the preceding pipe section 2, which had previously been pulled into mating position with the initial pipe section 1. It is noted that, as in the prior art, the pipe section 3 to be pulled in and joined is supported by a cable system from a crane (not illustrated), which takes up the vertical weight load of the pipe section 3. the pipe section is thus generally "floating" during the pulling in process.

STRUCTURE

Figure 2:
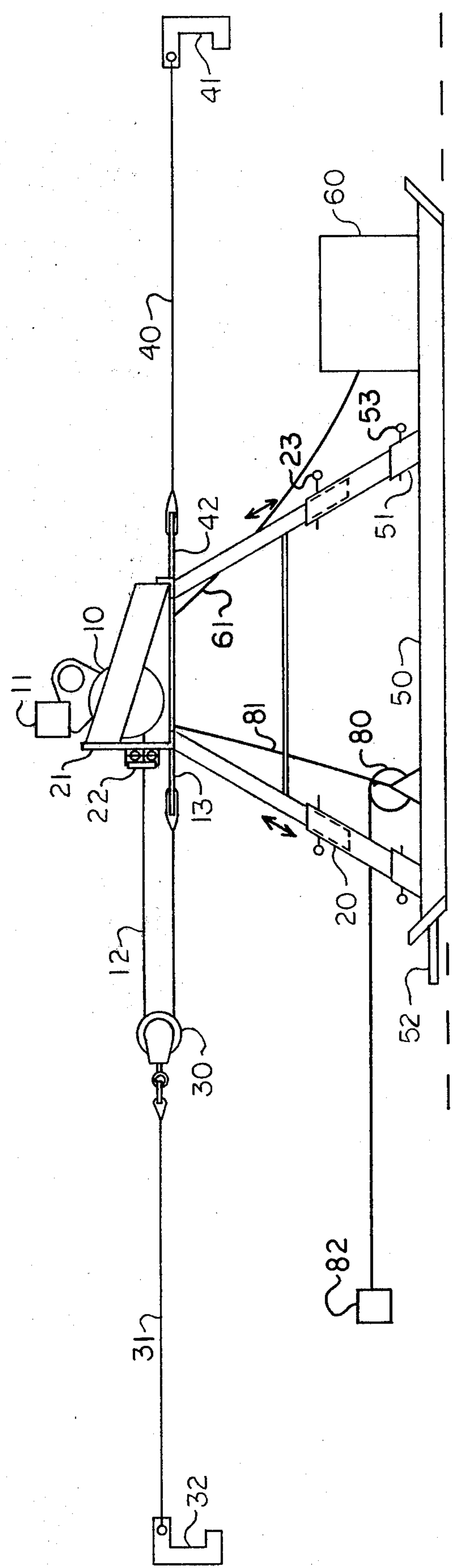
FIG. 2 is a side view of the preferred embodiment of the pipe joining device of the present invention depicting its mounting on a sled foundation.
Figure 3:
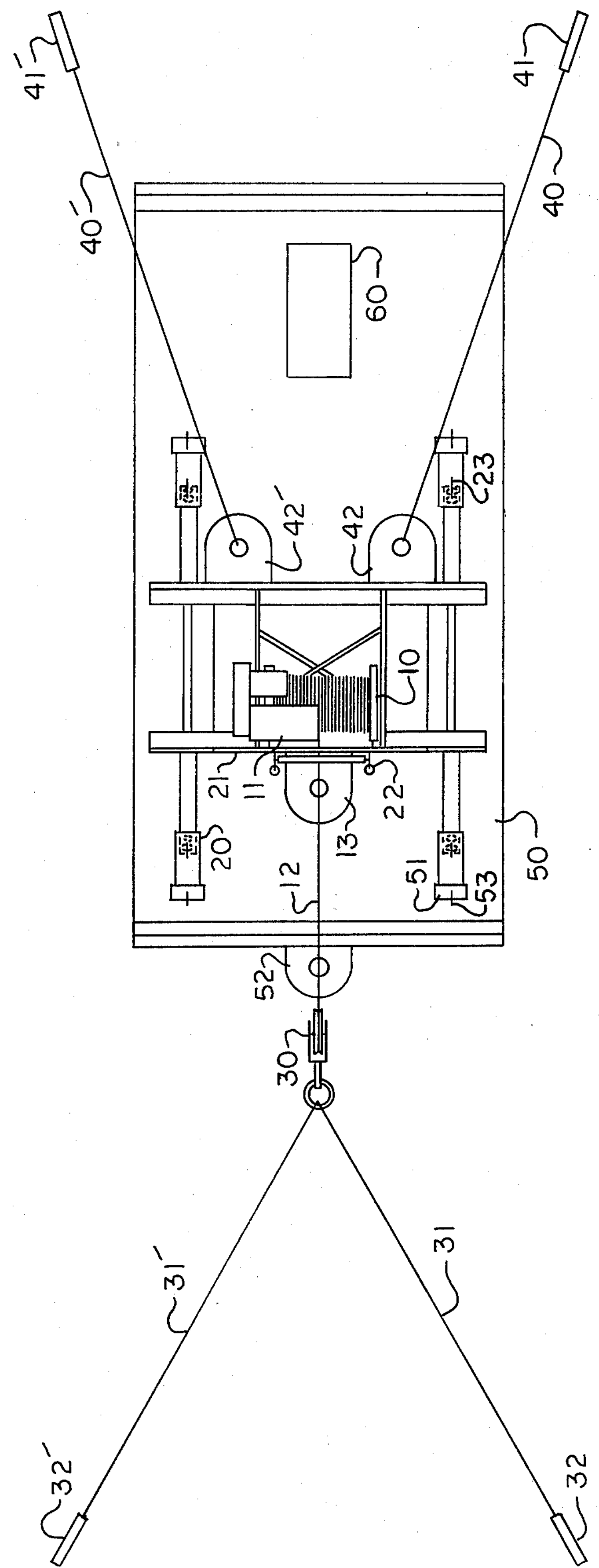
FIG. 3 is a plan view of the embodiment of FIG. 2.

As can best be seen in FIGS. 2 and 3, the preferred embodiment of the light weight, portable, self-contained pipe joining device of the present invention comprises a winch 10 and winch power drive unit 11, for example a wet cell battery operated electric drive unit, which is operable by a remote controller 82. The remote controller 82 is outfitted with a button to activate the winch power drive unit 11 in the forward, winch cable take-up mode, and a button to activate the winch power drive unit 11 in the reverse, winch cable pay out mode. The remote controller 82 is connected to the winch power drive unit 11 by an electrical control cable 81 which is mounted on a free reeling spool 80.

The winch 10 and winch power drive unit 11 are supported by an adjustable height stand 20. The legs of the stand 20 include telescoping sections in which the inner element of each section has a series of holes, and a locking pin 23 is used to lock the elements together at the selected height. The adjustable height stand 20 allows the pipe joining device to be vertically adjusted in height and laterally positioned within the preceding, initial pipe section 1 in such a way that the winch 10 is coincident with the intersection of the horizontal and vertical centerlines of the pipe section 1.

Affixed to the rear of the adjustable height stand 20 are anchor sling pad eyes 42, 42' to which are attached the static anchor slings 40, 40'. The sling hooks 41,41' secured to the static anchor slings 40,40' are fitted over the wall of the preceding pipe section 1 at the opposite end to which the succeeding pipe section 2 was mated, to provide an axial, reactive, anchoring force to the axial pulling force of the winch 10, thereby anchoring the pipe joining device in its desired location within the initial pipe section 1.

The winch cable 12 is led from the winch 10 through guide rollers 22 mounted in the vertical plate 21, which is affixed to the front of the adjustable height stand 20. The winch cable then proceeds through the snatch block 30 and back to the winch cable pad eye 13, to which it is affixed and which in turn is affixed to the front of the adjustable height stand 20 beneath the guide rollers 22.

A two part sling 31, 31' is attached to the snatch block 30. Sling hooks 32,32' secured to the opposite ends of the two part sling 31, 31' are fitted over the wall of the succeeding pipe section 3 at the opposite end to which it is to be mated with the preceding pipe section 2.

The adjustable height stand 20 may be mounted on a sled foundation or base 50. The sled foundation 50 is outfitted with holders 51 for each leg of the adjustable height stand 20, and a pad eye 52 for positioning the sled foundation 50. The sled foundation 50 is of sufficient size to accommodate a power source, for example a wet cell battery 60, which provides power through an electrical power cable 61 to for example an electric motor winch power drive unit 11. Latching pins 53 are included for locking the legs of the stand 20 into the holders 51.

EXEMPLARY MODIFICATIONS

Figure 4:
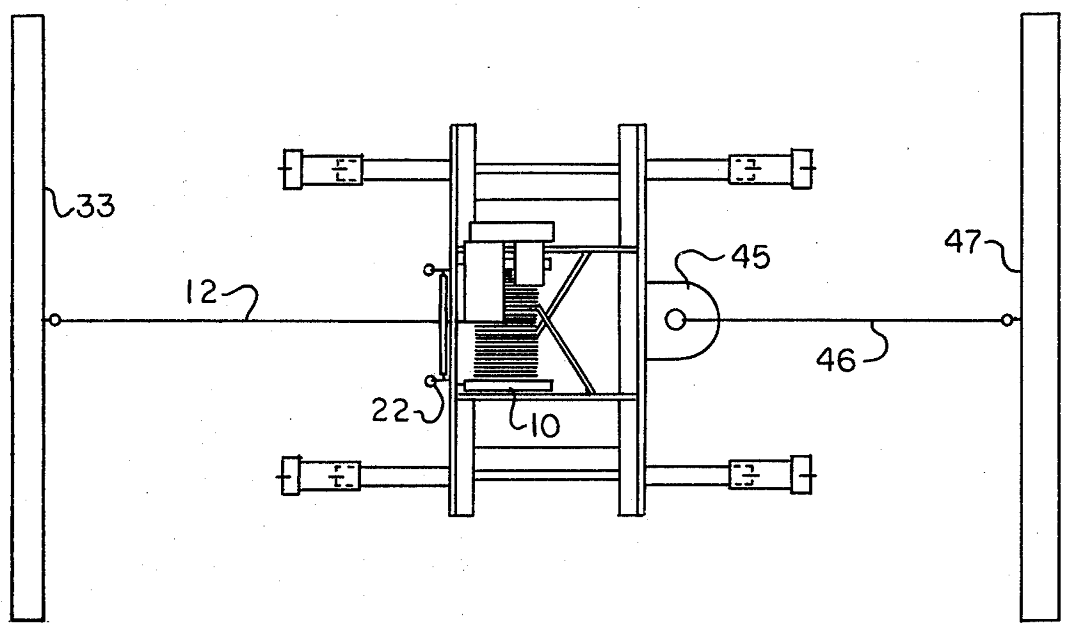
FIG. 4 is a plan view of an exemplary modification to the preferred embodiment of the invention.

Referring to FIG. 4 of the drawings, there are shown exemplary modifications. The winch cable 12 is led from the winch 10 through guide rollers 22 and fixed directly to a device for engaging the end of a succeeding pipe section, for example a strong back 33 of length greater than the outside diameter of the pipe section to be engaged. A single anchor sling pad eye 45 is affixed to the rear of the adjustable height stand 20. A single static anchor sling 46 is secured to the pad eye 45 and attached directly to a device for engaging the end of a preceding pipe section, for example a strong back 47 of length greater than the outside diameter of the pipe section to be engaged.

Figure 5:
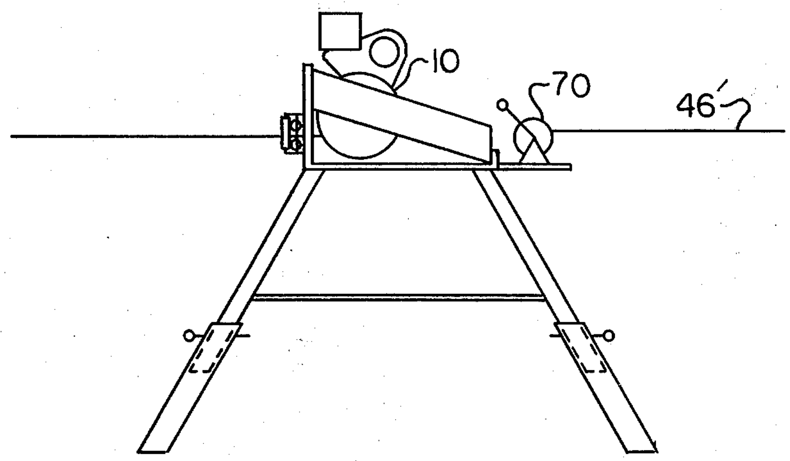
FIG. 5 is a side view of further exemplary modification of the preferred embodiment of the invention.

Referring to FIG. 5 of the drawings, therein is shown a further exemplary modification. The anchor sling 46' is secured to for example a hand-operated winch 70, thereby permitting the length of the anchor sling to be varied. This would allow the pipe joining device to be moved axially to a subsequent position within the joined pipe sections, when the capacity of the drum of the winch 10 has been realized, while still maintaining a basic anchoring position at the initial pipe section 1.

Operation

The operation of the light weight, portable, self-contained pipe joining device of the present invention will now be described. Once the preceding, initial pipe section 1 has been positioned, the pipe joining device of the present invention is installed inside the initial pipe section 1 near the end which is the opposite end to which the succeeding pipe section 2 is to be mated. For the purposes of this specification, the end of the initial pipe section nearest the position of the pipe joining device shall be known as the proximal end and the end, of the initial pipe section farthest from the position of the pipe joining device shall be known as the distal end. With regards to succeeding pipe sections, the end nearest the proximal end of the initial pipe section shall be known as the proximal end and the end farthest from the distal end, of the initial pipe section shall be known as the distal end.

The anchor sling hooks 41, 41' are placed over and hooked to the wall of the preceding, initial pipe section 1 at the proximal end, and the pipe pulling device is positioned axially so that the static anchor slings 40, 40' are taut. Next, the adjustable height stand 20 is adjusted so that the winch cable 12, when paid out, will be positioned coincidentally with the intersection of the horizontal and vertical centerlines of the initial pipe section 1.

Once the succeeding pipe section 2 has been positioned relative to the preceding, initial pipe section 1 the winch cable 12 is paid out, and the snatch block 30, to which is attached the two part sling 31, 31', is drawn through the interior of the preceding, initial pipe section 1 and the succeeding pipe section 2 to the distal end of the succeeding pipe section 2. The sling hooks 32, 32' are placed over the wall of the succeeding pipe section 2 at the distal end.

The winch 10 is now activated by depressing the forward winch cable take-up mode button on the remote controller 82, which energizes the winch power drive unit 11. The winch cable 12 is drawn in and an axial pulling force is transmitted to the succeeding pipe section 2. By this axial pulling force, the succeeding pipe section 2 is mated to the preceding pipe section 1. The winch 10 is next deactivated by releasing the forward winch cable take-up mode button on the remote controller 82, which de-energizes the winch power drive unit 11. The winch is next activated by depressing the reverse, winch cable pay-out mode button on the remote controller 82, which energizes the winch power drive unit 11. The winch cable 12 is paid out, and the two part sling 31, 31' becomes slack, permitting the removal of the sling hooks 32, 32' from the wall of the succeeding pipe section 2. The winch 10 is next deactivated by releasing the reverse, winch cable pay-out mode button on the remote controller 82, which de-energizes the winch power drive unit 11. This entire sequence may be accomplished by an operator positioned outside of the initial pipe section and all subsequent pipe sections, which greatly enhances the safety of the system of the present invention. Thus, it should be noted that the present invention provides a system in which all of the mechanical operative elements are located within the pipe sections, while the operation is controlled outside of the pipe sections. Of course, although not as preferred, it is possible to operate the system from within one of the pipe sections, should that ever be desirable.

The above described evolution may be repeated for multiple succeeding pipe sections without having to reposition the pipe joining device. The number of times this evolution may be repeated is determined by the length of the winch cable 12.

Thus, as is illustrated in FIG. 1, the next succeeding pipe section 3 is pulled into place against the preceding pipe sections 1 and 2. The procedure is then repeated for the fourth, fifth, sixth, etc., pipe sections.

It should be noted that the present invention was designed in its preferred embodiment to be used with very heavy pipe sections, such as for example pre-cast concrete pipe sections used for drainage lines and the like. A typical example of such a pipe section would be one having an eight foot length, an inner diameter of six feet, and a weight of one thousand, one hundred and eighty-six pounds per linear foot.

Because the invention is capable of many different embodiments and of being practiced and carried out in various ways, it should be understood that the invention is not limited in its application to the details and arrangements of parts illustrated in the accompanying drawings. It should also be understood that the phraseology and the terminology employed herein is merely for the purpose of description and not of limitation, and it is not intended to limit the invention claimed herein beyond the requirements of the prior art.

What is claimed is:

1. A light weight, portable, self-contained pipe joining device for temporary attachment to an initial, curvilinear pipe section for imparting axial movement to subsequent curvilinear pipe sections to facilitate joining of the pipe sections together, comprising:

a support stand positionable within the initial curvilinear pipe section, said support stand comprising four multi-part telescoping legs, two front legs and two rear legs, and a securing pin for each leg, each of which legs has an upper section of different cross-sectional area than the next corresponding, lower section into which it is secured by said pin, one of each said sections being fitted with a series of at least two, vertically spaced holes penetrating through the entire diameter of said one section in a front-to-back, longitudinal direction to receive said pin and said other section being fitted with a corresponding hole penetrating through the entire diameter of said other section to likewise receive a respective one of said pins, said telescoping legs being symmetrically and equidistantly spaced above the front-to-back longitudinal axis and the left-to-right transverse axis of said support stand to permit the alignment of said support stand with respect to the intersection of the vertical and horizontal axes of the cross-section of the initial curvilinear pipe section, a vertical plate mounted on edge and extending vertically upward from the upper end of said upper section adjacent the front telescoping leg sections in a plane perpendicular to the longitudinal axis of said support stand, said plate having an opening about which is fitted two sets of two rollers, each set of said rollers being fitted with one roller at each horizontal extent of said opening and the other set of said rollers being fitted one roller each at each vertical extent of said opening; said support stand being mounted on a sled foundation, said sled foundation comprised of a single flat plate horizontally oriented with a front to back longitudinal dimension greater than the left to right transverse dimension, said plate fitted with receptacles sized to receive the lower section of the telescoping leg of said support stand, said lower section of the telescoping leg secured in said receptacle by a pin said receptacles each fitted with a single hole appearing beneath the upper edge of said receptacle and penetrating through the entire diameter of said receptacle in a front to back longitudinal direction to receive said pin with a corresponding single hole appearing above the lower edge of said lower section of the telescoping leg and penetrating through the entire diameter of said lower section of the telescoping leg to receive said pin, said receptacle positioned symmetrically and equidistant about the front to longitudinal axis of said flat plate;

a power operated winch mounted symmetrically about the longitudinal axis of said support stand, said winch being outfitted with a winch cable, said winch cable being mounted on the cable drum of said winch, said cable drum having its axis perpendicular to the longitudinal axis of said support stand, its left and right extremes being equidistant from the longitudinal axis of said support stand and its axis a vertical height above said support stand being substantially equal to the vertical height above said support stand of said opening in said vertical plate through which said winch cable is lead;

winch power drive unit means operably connected to said winch for powering said winch;

engaging means connected to said winch cable for engaging the subsequent pipe section next to be joined; and anchoring means associated with said support stand for temporarily engaging the back end of the initial pipe section anchoring said support stand preventing any axial movement of the support stand relative to the initial pipe section.

2. The pipe joining device of claim 1, wherein said anchoring means is comprised of a pad eye mounted near the upper end of said upper section of the two rear telescoping legs and at least one anchoring cable, one end of which is attached to said pad eye of said support stand, and an open sided, back-edges hook securing means connected to the other end of said anchoring cable for removably but securely hooking over and engaging the side back edge of the initial pipe section.

3. The pipe joining device of claim 2, wherein said securing means comprise hooks means for engaging the back edge of the initial pipe section.

4. The pipe joining device of claim 2, wherein said securing means comprise strong back means for engaging the back edge of the initial pipe section.

5. The pipe joining device of claim 1, wherein said anchoring means is comprised of at least one anchoring cable of variable effective length, an anchoring winch, and an open, side, and a back edges hook securing means, said anchoring cable being mounted on said anchoring winch, said anchoring winch being attached to said support stand and said back edge securing means being connected to the free end of said anchoring cable for engaging the side, back edge of the initial pipe section and anchoring said support axially stand with respect to the back edge of the initial pipe section.

6. The pipe joining device of claim 1, wherein said engaging means comprise strong back means for engaging the edge of the subsequent pipe section next to be joined.

7. The pipe joining device of claim 1, wherein said winch cable is reaved through at least a single purchase snatch block and secured to a forwardly extending, essentially horizontal pad eye mounted on said support stand on the longitudinal axis of said support stand near the lower edge of said vertical plate, said single purchase snatch block being fitted with an engaging means for engaging the subsequent pipe section next to be joined.

8. The pipe joining device of claim 7, wherein said engaging means is comprised of a sling fitted with hook means for engaging the edge of the subsequent pipe section next to be joined.

9. The pipe joining device of claim 1, wherein said winch power drive unit means is an electric motor receiving energy from a wet cell battery.

10. The pipe joining device of claim 9, wherein said winch power drive unit means is remotely controllable through an electric control cable from outside the pipe sections being joined while all of the mechanical operative elements of the system are located within the pipe sections being joined.

11. The pipe joining device of claim 1, wherein said winch power drive unit means comprises an electric motor receiving energy from a wet cell battery, said wet cell battery being mounted on said sled foundation, said winch power unit means being remotely controllable through an extended electric control cable from outside the pipe sections being joined while all the mechanical operative elements of the system are located within the pipe sections being joined.

12. A method for imparting axial translative movement to a pipe section to facilitate joining of adjacent pipe section(s) including an initial pipe section, utilizing a light weight, portable, self-contained pipe joining device, comprising the following steps:

(a) providing a pipe joining device comprised of a support stand, which is positionable within the initial pipe section, and which is outfitted with an anchoring means including an anchoring cable for removeably but securely anchoring said support stand to the initial pipe section, a power operated winch and associated winch cable mounted on a cable drum which is positioned to be able to feed said winch cable in a direction perpendicular to the front to back longitudinal axis of the support stand and at least generally centered with respect to the longitudinal axis of the support stand and outfitted with an engaging means for engaging the succeeding pipe sections, and a winch power drive unit means operably connected to the power operated winch for powering the winch;

(b) installing the pipe joining device inside the initial pipe section near the end away from the end to which the succeeding pipe section is to be mated and positioning said support stand so that said engaging means when stretched out horizontally is at a height at least generally coinciding with the horizontal centerline of the cross-section of the initial pipe section;

(c) securely engaging the anchoring means of the pipe joining device to the side, back edge walls of the proximal end of the initial pipe section;

(d) adjusting the anchoring means axially so that the anchoring cable is taut;

(e) paying out the winch cable;

(f) drawing the winch cable and engaging means for engaging the distal end of the succeeding pipe section through the interior of the preceding pipe section and the succeeding pipe section;

(g) attaching the engaging means to the distal end of the succeeding pipe section;

(h) activating the winch power drive unit transmitting an axial pulling force relative to the succeeding pipe section resulting in a mating of the succeeding pipe section to the preceding pipe section;

(i) deactivating the winch power drive unit and slacking off the winch cable;

(j) removing the engaging means from engaging the distal end of the succeeding pipe section; and (k) repeating steps (e) through (j) above for subsequent, succeeding pipe sections.

13. The method of claim 12, wherein, after a number of succeeding pipe sections have been joined, the method further includes the step of:

varying the length of the anchoring means of the pipe joining device so that the pipe joining device may be repositioned axially within the joined pipe sections with respect to the joined pipe sections to a subsequent position within the joined sections which is a greater distance from the proximal end of the initial pipe section to permit the retreival of a portion of the paid out which cable allowing joining of additional succeeding pipe sections to those pipe sections already joined.

14. The method of claim 12, wherein step (a) includes the step of providing said anchoring means with at least two hooks, and wherein step (C) includes the step of engaging the back, side edges of the initial pipe section with said open hooks.

* * * * *